United States Patent [19]

Aoyama et al.

[11] Patent Number: 5,107,081
[45] Date of Patent: Apr. 21, 1992

[54] OPERATING MECHANISM FOR GAS FILLED SWITCHGEAR

[75] Inventors: Hiromichi Aoyama; Harumi Niwa; Kiyokazu Torimi, all of Hyogo, Japan

[73] Assignee: Mitsubishi Denki Kabushiki Kaisha, Tokyo, Japan

[21] Appl. No.: 758,718

[22] Filed: Sep. 9, 1991

[30] Foreign Application Priority Data

Oct. 26, 1987 [JP] Japan .................. 62-271168

[51] Int. Cl.$^5$ .................................... H01H 33/42
[52] U.S. Cl. .................. 200/148 F; 200/145
[58] Field of Search ................. 200/145, 148 F

[56] References Cited

U.S. PATENT DOCUMENTS

| | | | |
|---|---|---|---|
| 3,946,184 | 3/1976 | Yoshioka et al. | 200/148 F X |
| 4,215,256 | 7/1980 | Sakaguchi et al. | |
| 4,440,996 | 4/1984 | Calvino | 200/148 F X |
| 4,510,359 | 4/1985 | de Calvino y Teijerio | 200/148 F X |
| 4,652,708 | 3/1987 | Okuno et al. | 200/148 F |
| 4,814,560 | 3/1989 | Akesson | 200/148 F |

FOREIGN PATENT DOCUMENTS 60-183910 9/1985 Japan .

Primary Examiner—J. R. Scott
Attorney, Agent, or Firm—Oblon, Spivak, McClelland, Maier & Neustadt

[57] ABSTRACT

A gas filled switchgear comprising a first grounding switch housed sealingly in a container and having a plurality of linearly reciprocally movable first contacts and a second grounding switch housed sealingly in the container and having a plurality of second movable contacts. The second movable contacts are linearly reciprocally movable in a direction making a predetermined angle with respect to the reciprocal movement of the first contacts. A driving shaft drives the first movable contacts and second movable contacts.

7 Claims, 5 Drawing Sheets

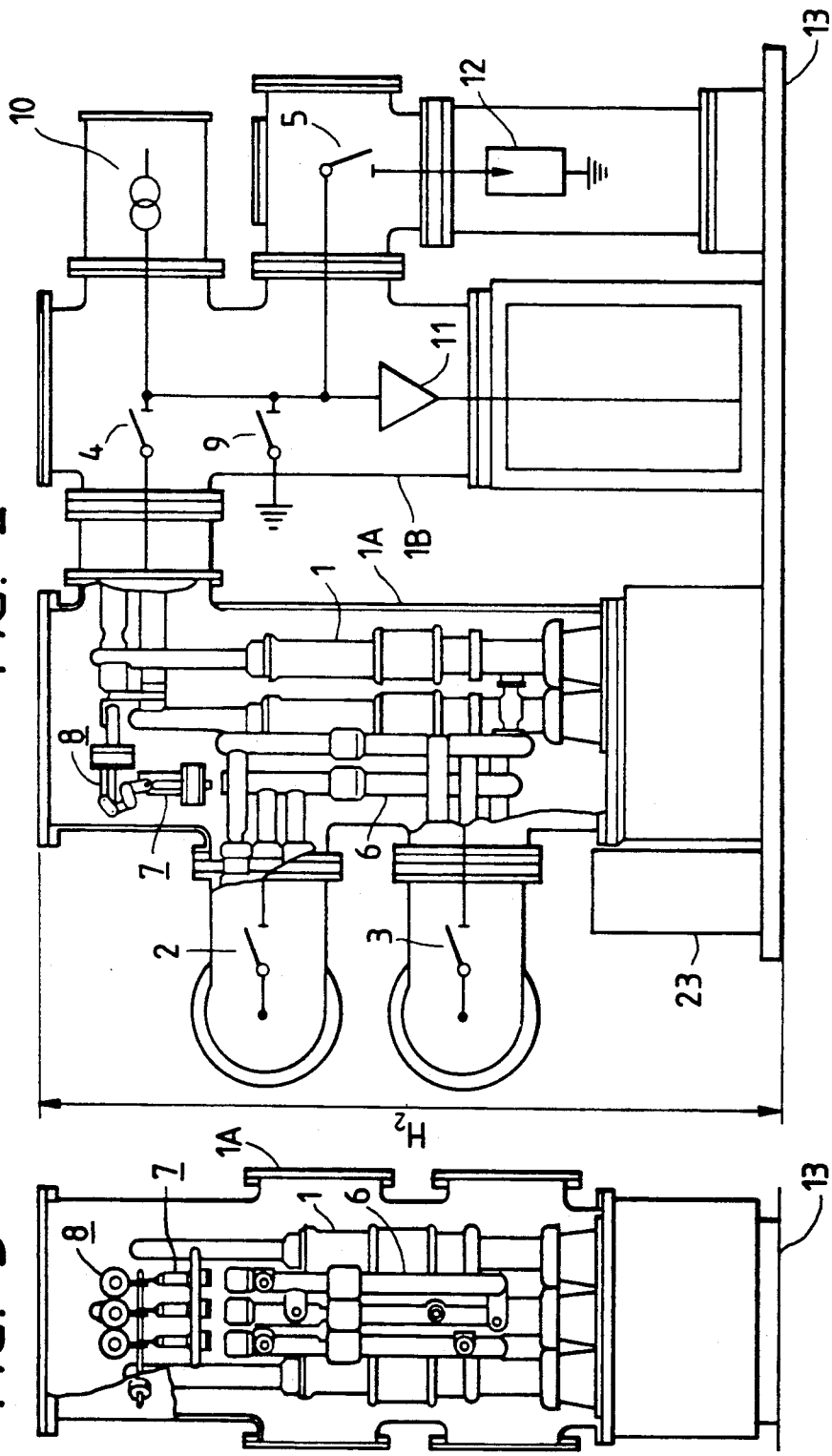

OPERATING MECHANISM FOR GAS FILLED SWITCHGEAR

This application is a continuation of Ser. No. 262,717, filed Oct. 26, 1988, now abandoned.

BACKGROUND OF THE INVENTION

The present invention relates to a gas filled switchgear to be used in a power plant and/or a substation.

FIG. 4 is a circuit diagram of a conventional gas filled switchgear in which three phase line is depicted as a single solid line. FIG. 5 shows an internal structure of the switchgear having the circuit diagram shown in FIG. 4 and corresponding to that disclosed in Japanese Patent Application Laid-Open No. 183910/1985, and FIG. 6 is a side view of the structure in FIG. 5.

In these figures, a gas filled switchgear 1A includes a breaker 1 and gounding switches 7 and 8 and a gas filled switchgear 2A includes a breaker 4, a grounding switch 9 and a cable terminal 11. In testing the breaker 1, the grounding switches 7 and 8 on both sides thereof are closed.

FIG. 7 shows a mechanism by which the grounding switches 7 and 8 are on-off controlled. In FIG. 7 in which the grounding switches 7 and 8 are shown as opened, the switches can be closed by pulling an operation box 23 down to move connecting rods 21 and 22 downwardly. Upon the downward movement of the rods, a lever 17 and hence a driving rotary shaft 70 mounting the lever 17 is rotated in a counterclockwise direction. The driving shaft 70 is supported by a sealed bearing 7A and a bearing 7B and supports, within a container, levers 71, 72 and 73 having associated links 74, 75 and 76. With the counterclockwise rotation of the driving shaft 70, the links 74 to 76 are pushed up by the levers 71 to 73, respectively, so that movable contacts 77, 78 and 79 connected to the respective links 74, 75 and 76 are made in contact with fixed contacts 15.

Further, with the downward movement of the connecting rod 22, a link 20 and an associated lever 18 are rotated in counterclockwise direction and a driving shaft 80 supported by a sealing bearing 8A and a bearing 8B and supporting levers 81, 82 and 83 similarly to the driving shaft 70 is also rotated counterclockwisely, so that links 84, 85 and 86 associated with the respective levers 81, 82 and 83 are pushed in a rightward direction. Therefore, movable contacts 87, 88 and 89 connected to the links 84, 85 and 86 are made in contact with fixed contacts 16.

In the conventional gas filled switchgear in which the grounding switches 7 and 8 are arranged above and below the breaker, respectively, an overall height H1 (FIG. 5) of the gas filled switchgear 1A is necessarily large.

Further, since the sealing bearings are to be provided at two vertical positions and a gas leakage problem of such bearings in unavoidable.

SUMMARY OF THE INVENTION

An object of the present invention is to provide a compact and reliable gas filled switchgear.

According to the present invention, two grounding switches are arranged in adjacent angular positions and contacts associated therewith are connected to a single driving shaft so that, by driving the single driving shaft, the grounding switches can be operated.

BRIEF DESCRIPTION OF THE DRAWING

FIG. 2 shows an internal structure of the switchgear in FIG. 1;

FIG. 3 is a side view of the switchgear shown in FIG. 2;

DETAILED DESCRIPTION OF THE PREFERRED EMBODIMENT

Figure 1:
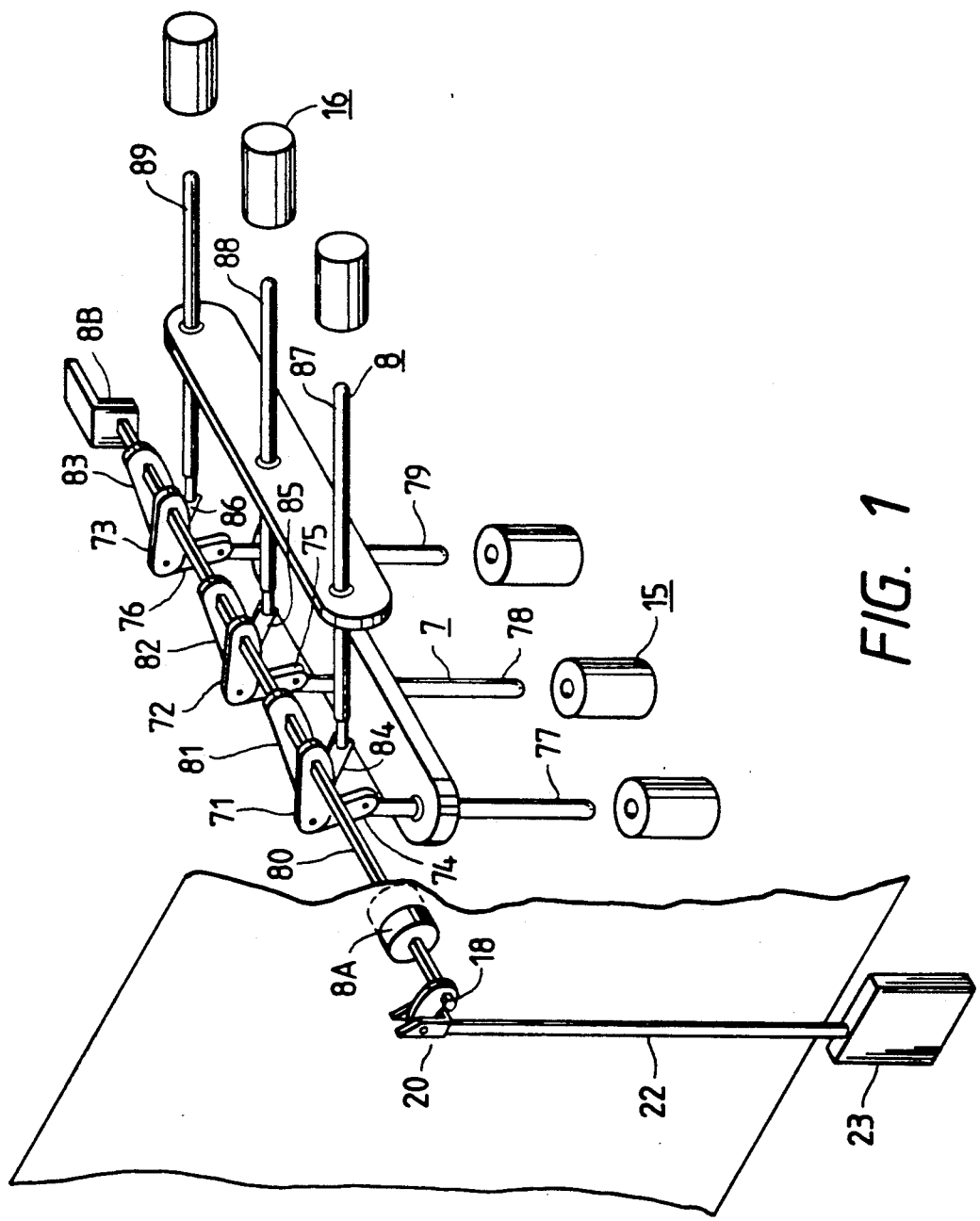
FIG. 1 shows in perspective view a mechanical structure of a gas filled switchgear according to an embodiment of the present invention.
Figure 4:
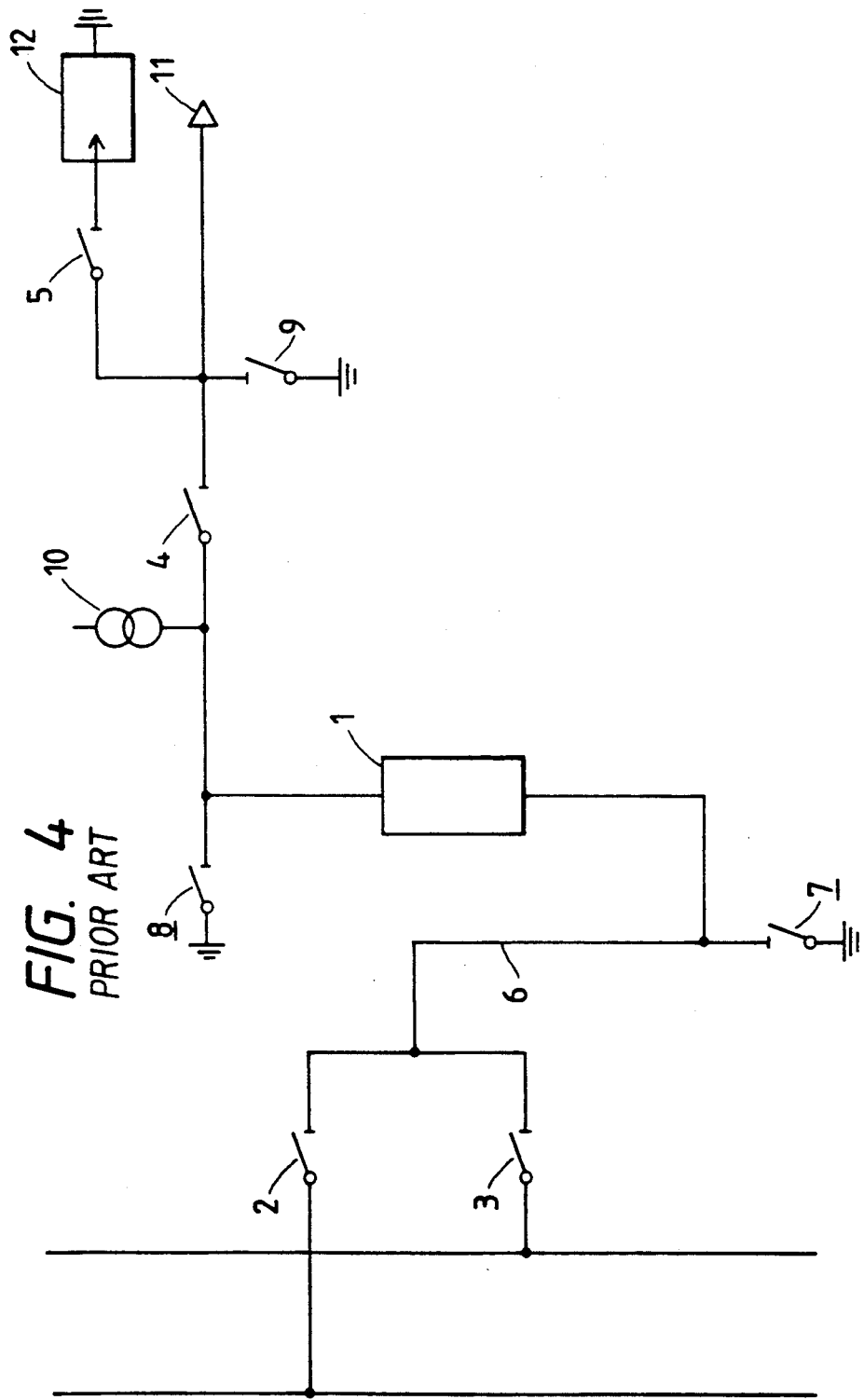
FIG. 4 is a circuit diagram of a conventional gas filled switchgear.
Figure 5:
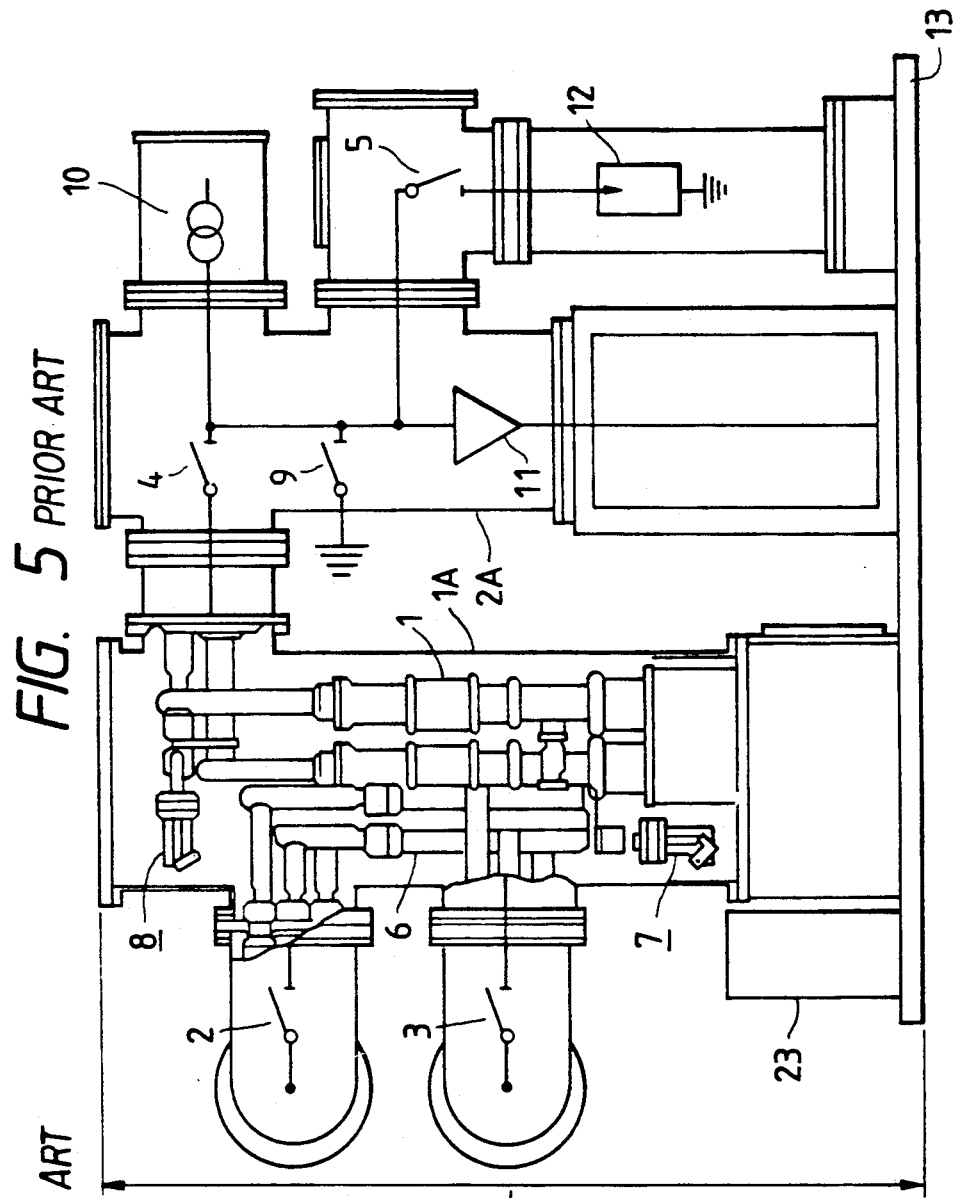
FIG. 5 is an internal structure of a conventional gas filled switchgear.
Figure 6:
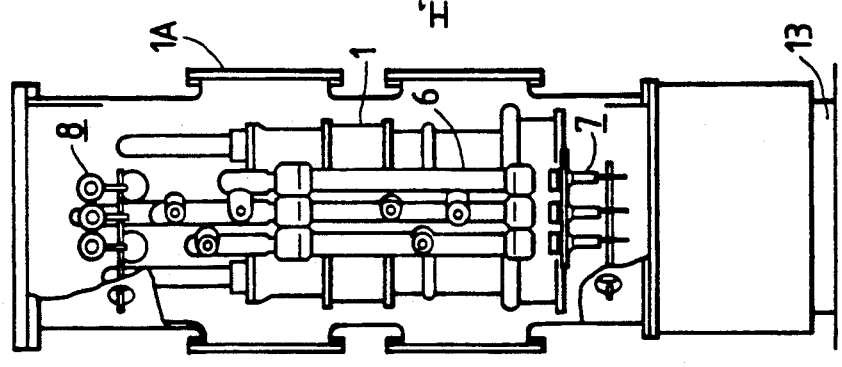
FIG. 6 is a side view thereof.
Figure 7:
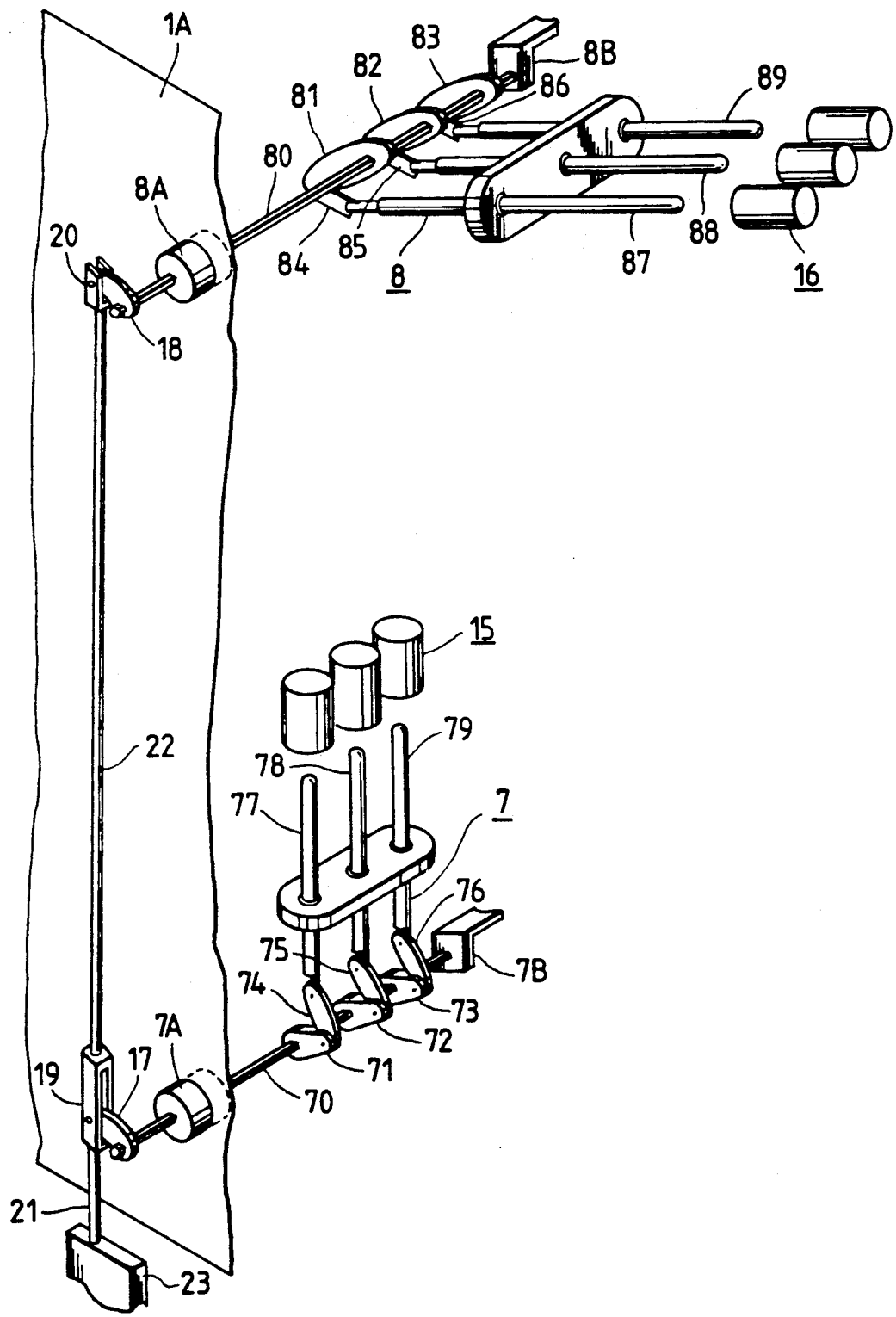
FIG. 7 shows a mechanical structure of the conventional gas filled switchgear.

In FIGS. 2 and 3 in which FIG. 2 is an internal structure thereof and FIG. 3 is a side view of the structure in FIG. 2, a gas filled switchgear 1A includes a breaker 1 and grounding switches 7 and 8 and a switchgear 1B includes a circuit breaker 4, a grounding switch 9 and a cable terminal 11. The breaker 1 is tested after the grounding switches 7 and 8 are closed.

A mechanism for on-off controlling the grounding switches 7 and 8 is shown in FIG. 1 in which the switches are in open state. As shown, the switches 7 and 8 are arranged in angular positions separated from each other by 90°. The switches 7 and 8 are turned on by pulling a connecting rod 22 through an operation box 23. With the downward movement of the connecting rod 22, a lever 18 fixedly mounted on one end of a driving shaft 80 is rotated counterclockwisely and thus the driving shaft is also rotated in the same direction. The driving shaft 80 is supported by a sealing bearing 8A provided in a wall of a container and a bearing 8B provided within the container and supports in a portion thereof between the bearings 8A and 8B levers 71, 72 and 73 fixedly. Therefore, with the counterclockwise rotation of the driving shaft 80, the levers 71 to 73 are also rotated and movable contacts 77, 78 and 79 connected to links 74, 75 and 76 associated with the respective levers are moved downwardly and made in contact with fixed contacts 15 arranged below.

The driving shaft 80 further supports levers 81, 82 and 83 which are rotated in a counterclockwise direction upon the counterclockwise rotation of the driving shaft 80. With the counterclockwise rotation of the levers 81 to 83, links 84, 85 and 86 associated therewith are pushed rightwardly, so that movable contacts 87, 88 and 89 connected with the respective links 84, 85 and 86 are made in contact with fixed contacts 16.

As mentioned above, the gas filled switchgear according to the present invention uses a single driving shaft for driving a pair of grounding switches. Therefore, the structure thereof is much simpler than that of the conventional switchgear and the overall height H2 (FIG. 3) thereof can be minimized. In addition, due to the fact that only one sealing bearing is necessary, the gas leakage problem can be considerably reduced. As a result, the present switchgear is inexpensive and highly reliable.

What is claimed is:

1. A gas filled switchgear comprising:
   a gas filled container;

a first ground switching means sealed in said container and having a plurality of linearly reciprocally movable first contacts;

a second ground switching means sealed in said container and having a plurality of linearly reciprocally movable second contacts;

said first and second contacts positioned to approximately form a 90° angle;

a single driving shaft connected to said first and second movable contacts; and a connecting rod connected to said drive shaft, wherein a movement of said connecting rod causes said drive shaft to rotate in a counterclockwise direction, thereby driving said first and second movable contacts into a contact position.

2. The switchgear according to claim 1, further comprising:

a plurality of first levers, wherein each of said first levers is connected between said driving shaft and one of said first movable contacts;

a plurality second levers, wherein each of said second levers is connected between said driving shaft and one of said second movable contacts;

wherein said movement of said driving shaft causes each of said first and second levers to also rotate in a counterclockwise direction.

3. The switchgear according to claim 2, wherein each of said first and second levers are connected to said driving shaft.

4. A gas filled switchgear comprising:

a gas filled container;

a first ground switching means sealed in said container and having a plurality of linearly reciprocally movable first contacts;

a second ground switching means sealed in said container and having a plurality of linearly reciprocally movable second contacts;

a single driving shaft connected to said first and second movable contacts;

a plurality of first levers, wherein each first lever is connected between said driving shaft and one of said first movable contacts;

a plurality of second levers wherein each second lever is connected between said driving shaft and one of said second movable contacts; and a connecting rod connected to said drive shaft, wherein a movement of said connecting rod causes said drive shaft to rotate in a counterclockwise direction, thereby driving said first and second movable contacts into a contact position.

5. The apparatus according to claim 4, wherein said movement of said driving shaft causes each of said first and second levers to also rotate in a counterclockwise direction.

6. The apparatus according to claim 5, wherein said first and second movable contacts are positioned to approximately form a 90° angle.

7. The apparatus according to claim 4, wherein said first and second movable contacts are positioned to approximately form a 90° angle.

* * * * *

UNITED STATES PATENT AND TRADEMARK OFFICE
CERTIFICATE OF CORRECTION

PATENT NO. : 5,107,081
DATED     : April 21, 1992
INVENTOR(S) : Hiromichi Aoyama et al.

It is certified that error appears in the above-identified patent and that said Letters Patent is hereby corrected as shown below: On the title page:

The related U.S. application data has been omitted, should be, --Continuation of Ser. No. 262,717, Oct. 26, 1988, abandoned--.

Signed and Sealed this

Thirteenth Day of July, 1993

Attest:

MICHAEL K. KIRK

Attesting Officer

Acting Commissioner of Patents and Trademarks